US012692153B1

(12) United States Patent
Panzarino

(10) Patent No.: US 12,692,153 B1
(45) Date of Patent: Jul. 28, 2026

(54) SYSTEMS FOR PYROLYZING METHANE

(71) Applicant: Plan Beta LLC, Lone Tree, CO (US)

(72) Inventor: Patrick J. Panzarino, Lone Tree, CO (US)

(73) Assignee: Plan Beta LLC, Lone tree, CO (US)

( * ) Notice: Subject to any disclaimer, the term of this patent is extended or adjusted under 35 U.S.C. 154(b) by 0 days.

(21) Appl. No.: 19/636,138

(22) Filed: Apr. 1, 2026

Related U.S. Application Data

(62) Division of application No. 19/291,870, filed on Aug. 6, 2025, now Pat. No. 12,617,675.

(51) Int. Cl.
| | |
|---|---|
| *C01B 3/28* | (2026.01) |
| *B01D 53/22* | (2006.01) |
(Continued)

(52) U.S. Cl.
CPC ............. *C01B 3/28* (2013.01); *B01D 53/226* (2013.01); *B01D 53/229* (2013.01); *B01J 8/0015* (2013.01); *B01J 8/006* (2013.01); *B01J 8/085* (2013.01); *B01J 8/087* (2013.01); *B01J 8/12* (2013.01); *B01D 2053/221* (2013.01); *B01D 2256/16* (2013.01); *B01D 2257/7025* (2013.01); *B01J 2208/00176* (2013.01);
(Continued)

(58) Field of Classification Search
CPC ...... C01B 3/28; B01D 53/226; B01D 53/229; B01J 8/0015; B01J 8/006; B01J 8/085; B01J 8/087; B01J 8/12
USPC ........................................................ 423/651
See application file for complete search history.

(56) References Cited

U.S. PATENT DOCUMENTS

| | | | |
|---|---|---|---|
| 4,056,602 | A | 11/1977 | Matovich |
| 5,650,132 | A | 7/1997 | Murata et al. |
(Continued)

FOREIGN PATENT DOCUMENTS

| | | | |
|---|---|---|---|
| KR | 2022162266 | ‡ | 12/2022 |
| WO | WO-WO-2018177997 A1 | ‡ | 10/2018 |
(Continued)

OTHER PUBLICATIONS

Masyuk et al., "Effect of infrared laser radiation on gas-phase pyrolysis of ethane", Journal of Analytical and Applied Pyrolysis 134 (2018) 122-129. (Year: 2018).‡

*Primary Examiner* — Anita Nassiri-Motlagh
(74) *Attorney, Agent, or Firm* — Fennemore Craig, P.C.

(57) ABSTRACT

Systems and methods of pyrolyzing gaseous hydrocarbons include a reaction chamber and a plenum in fluid communication therewith. A light source directs electromagnetic radiation through a window into the reaction chamber. A first recirculation conduit connected between an offtake and an intake of the reaction chamber recirculates to the intake of the reaction chamber a portion of an aerosol product from the offtake of the reaction chamber. A filter operatively associated with the offtake of the reaction chamber receives un-recirculated amounts of the aerosol product and produces a retentate that includes particulate matter removed from the aerosol product. First and second gas separators operatively associated with the filter separate hydrogen and unreacted hydrocarbons from a filtrate of the filter. A second recirculation conduit connected between the second gas separator and the intake of the plenum recirculates unreacted hydrocarbons from the filtrate to the plenum.

26 Claims, 3 Drawing Sheets

(51) Int. Cl.

| | |
|---|---|
| *B01J 8/00* | (2006.01) |
| *B01J 8/08* | (2006.01) |
| *B01J 8/12* | (2006.01) |

(52) U.S. Cl.

CPC .................. *B01J 2208/0046* (2013.01); *B01J 2208/00752* (2013.01); *B01J 2208/00805* (2013.01); *C01B 2203/0277* (2013.01); *C01B 2203/0405* (2013.01); *C01B 2203/0855* (2013.01); *C01B 2203/1241* (2013.01)

(56) References Cited

U.S. PATENT DOCUMENTS

| | | | |
|---|---|---|---|
| 6,872,378 | B2 | 3/2005 | Weimer et al. |
| 7,033,570 | B2 | 4/2006 | Weimer et al. |
| 7,157,167 | B1 | 1/2007 | Muradov |
| 8,002,854 | B2 | 8/2011 | Muradov |
| 8,092,778 | B2 | 1/2012 | Zhu et al. |
| 8,147,765 | B2 | 4/2012 | Muradov et al. |
| 8,673,035 | B2 | 3/2014 | Weimer et al. |
| 9,434,612 | B2 | 9/2016 | Hyde et al. |
| 11,897,768 | B2 | 2/2024 | Ashton et al. |
| 12,145,846 | B2 | 11/2024 | Thomson et al. |
| 2002/0007594 | A1‡ | 1/2002 | Muradov ............. B01J 19/2475 48/78 |
| 2006/0140848 | A1 | 6/2006 | Weimer et al. |
| 2014/0255806 | A1 | 9/2014 | Ganapathi et al. |
| 2021/0047180 | A1 | 2/2021 | Hart et al. |
| 2024/0109048 | A1 | 4/2024 | Gallagher et al. |
| 2024/0208821 | A1 | 6/2024 | Miyakoshi et al. |
| 2024/0217815 | A1 | 7/2024 | Ashton et al. |
| 2024/0228289 | A1 | 7/2024 | Abuseada et al. |
| 2025/0128943 | A1 | 4/2025 | Francke et al. |

FOREIGN PATENT DOCUMENTS

| | | |
|---|---|---|
| WO | WO-WO-2024150163 A1 ‡ | 7/2024 |
| WO | WO-WO-2024192463 A1 ‡ | 9/2024 |

‡ imported from a related application

SYSTEMS FOR PYROLYZING METHANE

CROSS-REFERENCE TO RELATED APPLICATION

This application is a divisional of co-pending U.S. patent application Ser. No. 19/291,870, filed on Aug. 6, 2025, now allowed, which is hereby incorporated herein by reference for all that it discloses.

TECHNICAL FIELD

The present invention relates to systems and methods for carrying out high-temperature dissociation reactions in general and more specifically to systems and methods of dissociating hydrocarbon reactant materials.

BACKGROUND

Various types of systems and methods of pyrolyzing or dissociating hydrocarbon reactant materials are well-known in the art and have been used for decades to produce hydrogen, hydrogen-containing gases, and carbon, for example. In the case of hydrocarbons, the dissociation reactions are conducted in the absence of oxygen, thereby eliminating or substantially reducing the production of carbon dioxide. Such systems generally involve a reactor for receiving the hydrocarbon reactant material and a means for heating the hydrocarbon reactant material within the reactor to initiate and maintain the pyrolyzation or dissociation reaction. The reaction is endothermic and requires a constant supply of energy to maintain the reaction. The energy may be provided from any of a wide range of sources, including electrically heated elements, electric arcs, flames, or radiant energy from solar or laser sources, for example. Many such reactors transfer heat to the reactants by convection and/or conduction, which may limit the types of materials that can be used for the reactors. Moreover, in the case of a convective reactor, a significant portion of the heat energy required for the continued pyrolyzation reaction may come from the reactor walls themselves. However, since the reactor walls are good reaction sites, dissociated carbon from the reaction tends to build up on the reactor walls, which results in reduced heat transfer and, in some reactor designs, even clogging of internal tubes.

Such reactors also may be susceptible to thermal runaway. For example, during the pyrolysis of natural gas, the thermal conductivity of the gas phase may suddenly increase, often by an order of magnitude or more, depending on the composition of the gas. Because it is difficult to quickly control the temperature of a convective reactor, such reactors are prone to thermal runaway, which can result in explosions.

Partly in an effort to address some of the drawbacks associated with convective reactors, several different types of fluid wall reactors have been developed. While such fluid wall reactors have proven effective in addressing some of these drawbacks associated with convective reactors, they have not proven to be a panacea. For example, many fluid wall reactors are complex and difficult to construct or may require the provision of substantial amounts of inert gases to be supplied during operation, thereby increasing costs. Consequently, there is a continuing need for systems and methods for pyrolyzing hydrocarbon reactant materials that solve some of the drawbacks associated with known systems and methods.

SUMMARY

One embodiment of a method of pyrolyzing a hydrocarbon reactant material according to the disclosed instrumentalities may include: Introducing the hydrocarbon reactant material into an intake of a plenum that is in fluid communication with a reaction chamber; introducing a particulate material into an intake of the reaction chamber, the particulate material mixing with the hydrocarbon reactant material from the plenum to form an aerosol; exposing the aerosol to electromagnetic radiation of sufficient energy to raise the temperature of the particulate material to a level sufficient to initiate pyrolyzation of the gaseous hydrocarbon reactant material and produce an aerosol product; withdrawing the aerosol product via an offtake of the reaction chamber; recirculating a portion of the withdrawn aerosol product to the intake of the reaction chamber, the recirculated portion of the aerosol product mixing with additional quantities of the gaseous hydrocarbon reactant material from the plenum, the recirculated portion of the aerosol product comprising the particulate material that is introduced into the intake of the reaction chamber; filtering non-recirculated portions of the aerosol product to produce a filtrate substantially devoid of particulate matter; separating a first gas constituent from the filtrate, the first gas constituent comprising hydrogen; separating a second gas constituent from the filtrate, the second gas constituent comprising unreacted amounts of the gaseous hydrocarbon reactant material; and recirculating the second gas constituent to the inlet of the plenum.

Also disclosed is hydrogen gas produced by a method that includes: Introducing a gaseous hydrocarbon reactant material into an intake of a plenum that is in fluid communication with a reaction chamber; introducing a particulate material into an intake of the reaction chamber, the particulate material mixing with the gaseous hydrocarbon reactant material from the plenum to form an aerosol; exposing the aerosol to electromagnetic radiation sufficient to raise the carbon particulate seed material to a temperature in a range of about 400° C. to about 1200° C. to produce an aerosol product; withdrawing the aerosol product via an offtake of the reaction chamber; recirculating a portion of the withdrawn aerosol product to the intake of the reaction chamber, the recirculated portion of the aerosol product mixing with additional quantities of the gaseous hydrocarbon reactant material from the plenum, the recirculated portion of the aerosol product comprising the particulate material that is introduced into the intake of the reaction chamber; filtering non-recirculated portions of the aerosol product to produce a filtrate substantially devoid of particulate matter; and separating hydrogen gas from the filtrate.

Apparatus for pyrolyzing a gaseous hydrocarbon reactant material to produce hydrogen gas is also disclosed that includes a reactor having a reaction chamber and a plenum in fluid communication with the reaction chamber. The reactor also includes a window that allows electromagnetic radiation to enter the reaction chamber. A light source operatively associated with the window of the reactor directs electromagnetic radiation into the reaction chamber through the window. A first recirculation conduit operatively connected between an offtake of the reaction chamber and an intake of the reaction chamber recirculates to the intake of the reaction chamber a portion of an aerosol product from the offtake of the reaction chamber. A filter operatively associated with the offtake of the reaction chamber receives un-recirculated amounts of the aerosol product from the reaction chamber and produces a filtrate and a retentate, the retentate including particulate matter removed from the aerosol product. A first gas separator operatively associated with the filter separates a first gas constituent from the filtrate, the first gas constituent including hydrogen. A second gas separator operatively associated with the first gas separator separates a second gas constituent from the filtrate, the second gas constituent including unreacted amounts of the gaseous hydrocarbon reactant material. A second recirculation conduit operatively connected between the second gas separator and the intake of the plenum recirculates to the intake of the plenum the second gas constituent removed by the second gas separator.

Also disclosed is a reactor that includes a housing having a first end, a second end, and a side wall connecting the first and second ends to define a reaction chamber therebetween, at least a portion of the side wall of the housing defines at least one aperture therein. A plenum surrounding at least the portion of the side wall of the housing defining the at least one aperture therein defines an internal region that is in fluid communication with the reaction chamber via the at least one aperture. A window mounted within the first end of said reaction chamber is substantially gas-tight and substantially transparent to electromagnetic radiation in at least an infrared wavelength range so that infrared electromagnetic radiation passing through the window enters the reaction chamber defined by the housing of the reactor.

BRIEF DESCRIPTION OF THE DRAWINGS

Illustrative and presently preferred exemplary embodiments of the invention are shown in the drawings in which.

DETAILED DESCRIPTION OF THE PREFERRED EMBODIMENTS

The following is a detailed description of exemplary embodiments that illustrate the principles of the disclosed instrumentalities. The embodiments are provided to illustrate various aspects of the disclosed instrumentalities. However, the disclosed instrumentalities should not be regarded as limited to any particular embodiment or combination of features. The disclosed instrumentalities teach by way of example and not by limitation. Therefore, the scope of the disclosed instrumentalities encompasses numerous alternatives, modifications, and equivalents.

Figure 1:
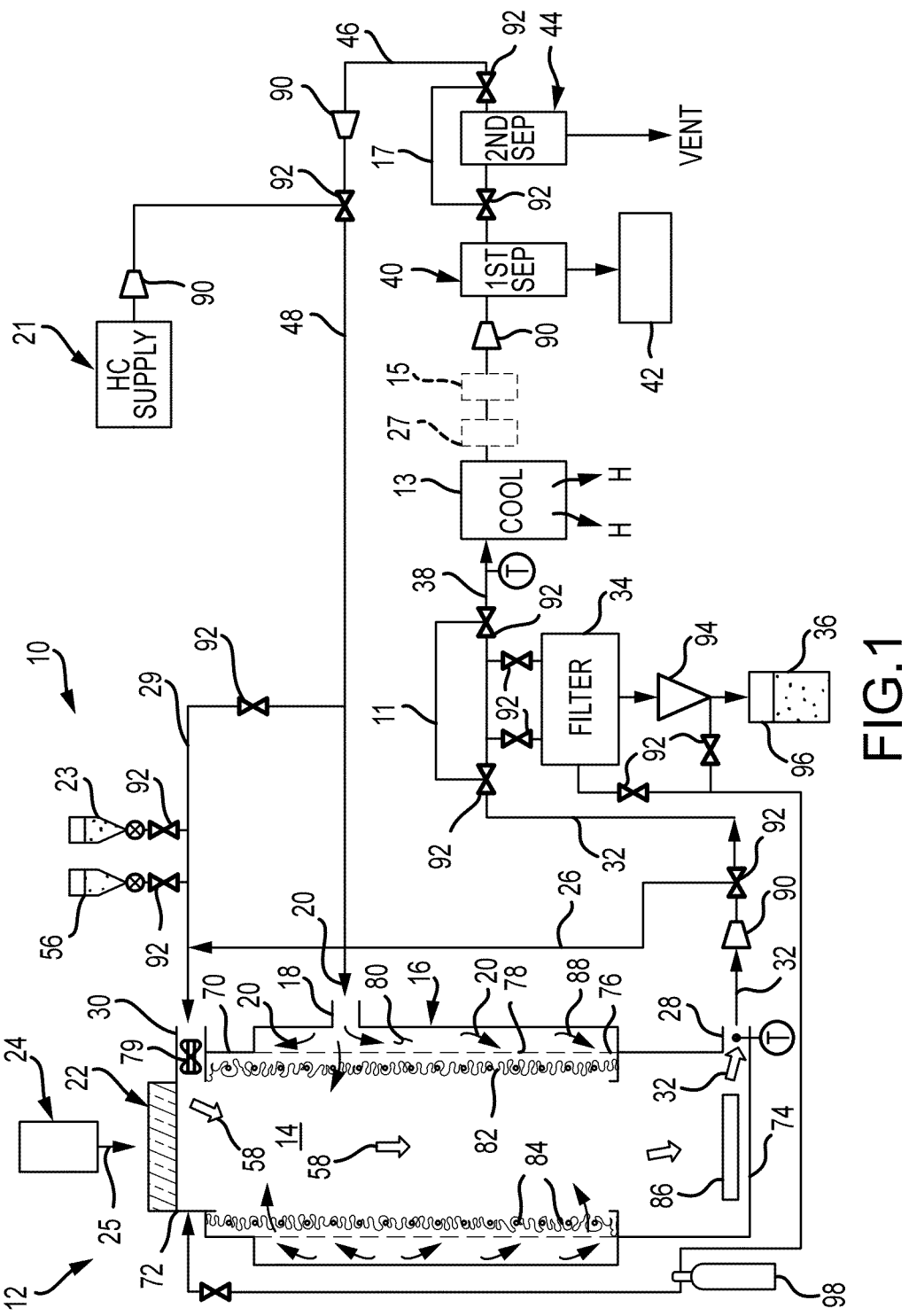
FIG. 1 is a schematic representation of one embodiment a system for pyrolyzing hydrocarbons according to the disclosed instrumentalities.

Briefly described, one embodiment system or apparatus 10 for pyrolyzing hydrocarbons according to the teachings of the disclosed instrumentalities is schematically illustrated in FIG. 1 and may comprise a reactor 12 having a reaction chamber 14 and a plenum 16. Plenum 16 is in fluid communication with the reaction chamber 14 and includes an intake 18 that is configured to receive a hydrocarbon reactant material 20, such as natural gas or methane ($CH_4$), from a suitable supply 21. Reactor 12 may also comprise a window 22 that is substantially transparent to electromagnetic radiation. In the particular embodiments shown and described herein, the window 22 is substantially transparent to light in the infrared wavelength range or band. A light source 24 operatively associated with window 22 produces electromagnetic radiation 25 (e.g., light in the infrared wavelength band) and directs it into reaction chamber 14 via window 22.

System or apparatus 10 may also include a first recirculation line or conduit 26. First recirculation line or conduit 26 is operatively connected between an offtake 28 of reaction chamber 14 and an intake 30 of reaction chamber 14. As will be described in greater detail below, first recirculation conduit 26 recirculates to intake 30 of reaction chamber 14 a portion of an aerosol product 32 produced within reaction chamber 14. As will be described in further detail below, aerosol product 32 may comprise carbon, C (e.g., in particulate form), gaseous hydrogen, $H_2$, unreacted (i.e., undissociated) amounts of the hydrocarbon reactant material 20, and other constituents, e.g., nitrogen, $N_2$, that may also have been present in hydrocarbon reactant material 20. Aerosol product 32 may also comprise incomplete dissociation products (e.g., partially dissociated products) and other gases, again depending on the particular composition of hydrocarbon reactant material 20.

A filter system 34 also operatively associated with offtake 28 of reaction chamber 14 receives the balance (i.e., nonrecirculated amounts) of aerosol product 32 from reaction chamber 14. Filter system 34 removes the particulate matter, e.g., carbon, from aerosol product 32 as retentate 36. The filtered aerosol product 32, i.e., substantially devoid of particulate matter, then leaves filter system 34 as filtrate 38. Being substantially devoid of particulate matter, filtrate 38 may therefore comprise gaseous hydrogen, unreacted or undissociated amounts of hydrocarbon reactant material 20, and partially reacted amounts of hydrocarbon reactant material 20. Again, filtrate 38 may also comprise other constituents, e.g., nitrogen, that may have been present in hydrocarbon reactant material 20 before pyrolyzation.

A first gas separator system 40 operatively associated with filter system 34 separates a first gas constituent 42 from filtrate 38. In embodiments wherein hydrocarbon reactant material 20 comprises natural gas or methane, first gas constituent 42 may comprise hydrogen gas, $H_2$. A second gas separator system 44 operatively associated with first gas separator system 40 separates a second gas constituent 46 from filtrate 38. Second gas constituent 46 may comprise unreacted (i.e., undissociated) amounts of hydrocarbon reactant material 20, as well as partially-reacted amounts of hydrocarbon reactant material 20. For example, and in the particular embodiments shown and described herein wherein hydrocarbon reactant material 20 comprises natural gas or methane, second gas constituent may comprise unreacted amounts of natural gas or methane. A second recirculation conduit or line 48 operatively connected between second gas separator system 44 and intake 18 of plenum 16 recirculates to plenum 16 second gas constituent 46 removed by second gas separator system 44. The recirculated second gas constituent 46 mixes (e.g., within plenum 16) with additional amounts of hydrocarbon reactant material 20 from supply 21 and is thereafter pyrolyzed within reaction chamber 14.

Figure 2:
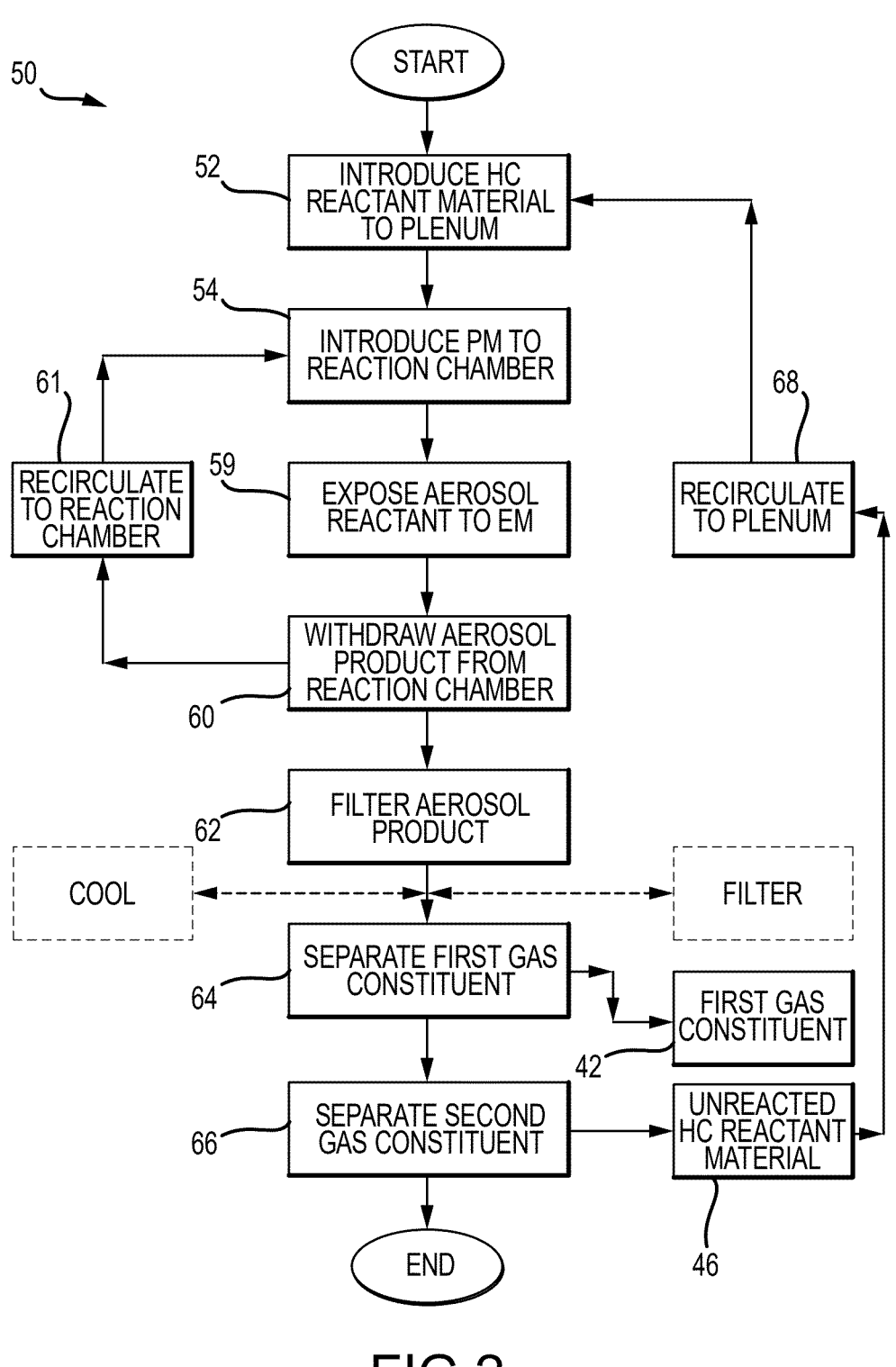
FIG. 2 is a flow chart representation of one embodiment of a method of pyrolyzing hydrocarbons according to the disclosed instrumentalities.

With reference now to FIGS. 1 and 2 simultaneously, system 10 may be operated in accordance with a method 50 to produce a hydrogen product, i.e., first gas constituent 42, by the pyrolyzation or dissociation of hydrocarbon reactant material 20. A first step 52 of method 50 involves introducing hydrocarbon reactant material 20 (e.g., from supply 21) into plenum 16 of reactor 12. Because plenum 16 is in fluid communication with reaction chamber 14 of reactor 12, hydrocarbon reactant material 20 from plenum 16 will migrate into reaction chamber 14. A next step 54 may involve the introduction of a particulate material into reaction chamber 14 via intake 30. Particulate material mixes with hydrocarbon reactant material 20 in reaction chamber 14 to form or produce an aerosol reactant material 58.

As will be described in greater detail below, upon system start-up, step 54 may involve the introduction of a particulate seed material 56 into reaction chamber 14. However, during operation, the particulate material introduced in step 54 may comprise particulate material present in aerosol product 32 recirculated via first recirculation conduit 26. The introduction of separate particulate seed material 56 may then be terminated. In any event, the introduced particulate material (i.e., either comprising particulate seed material 56 or particulate material contained within recirculated aerosol product 32) mixes with hydrocarbon reactant material 20 in reaction chamber 14 to form aerosol reactant material 58.

A next step 59 of method 50 involves exposing aerosol reactant material 58 contained within reaction chamber 14 to electromagnetic radiation 25 (e.g., infrared light) from light source 24. The electromagnetic radiation 25 is provided at an intensity sufficient to raise the temperature of the particulate matter (e.g., particulate seed material 56 or particulate matter from recirculated aerosol product 32) in aerosol reactant material 58 to a temperature sufficient to pyrolyze hydrocarbon reactant material 20 and form or produce aerosol product 32. Continued pyrolyzation of the hydrocarbon reactant material 20 occurs as aerosol feedstock 58 travels through reaction chamber 14, eventually being withdrawn at step 60 from reaction chamber 14 via offtake 28 as aerosol product 32.

Step 61 involves recirculating a portion of the withdrawn aerosol product 32 to intake 30 of reaction chamber 14. As mentioned earlier, the withdrawn aerosol product 32 may comprise particulate matter (e.g., carbon), gaseous hydrogen (resulting from the pyrolyzation of the hydrocarbon reactant material 20), as well as unreacted or undissociated amounts of the hydrocarbon reactant material 20. The particulate matter in recirculated aerosol product 32 may then form the particulate matter introduced in step 54, thereby allowing the introduction of particulate seed material 56 to be terminated. The unreacted hydrocarbon reactant material 20 in recirculated aerosol product 32 will be added to hydrocarbon reactant material 20 from supply 21 introduced into reaction chamber 14 via plenum 16.

In step 62, the balance (i.e., the un-recirculated portion) of aerosol product 32 withdrawn from offtake 28 is then filtered, e.g., by filter system 34, to remove particulate matter (e.g., carbon) as retentate 36. Retentate 36 may thereafter be removed from filter system 34 and collected for subsequent beneficial use. As mentioned earlier, filtrate 38 from filtering step 62 may comprise substantially gaseous constituents, e.g., hydrogen and unreacted amounts of hydrocarbon reactant material 20, although some particulate matter may remain depending on the performance characteristics of filter system 34. A next step 64 of method 50 involves the separation of first gas constituent 42 from filtrate 38. In the particular embodiments shown and described herein, first gas constituent 42 may comprise hydrogen gas. The first gas constituent 42 may thereafter be collected for subsequent beneficial use.

A second gas separation step 66 removes second gas constituent 46 from filtrate 38. Second gas constituent may comprise unreacted or undissociated amounts of the hydrocarbon reactant material 20. Second gas constituent 46 is then recirculated at step 68 to intake 18 of plenum 20 for mixing with hydrocarbon reactant material 20 from supply

21 and subsequent pyrolyzation. Any remaining constituents from filtrate 38, e.g., primarily gaseous nitrogen, $N_2$, may be vented to the atmosphere or collected for subsequent beneficial use.

A significant advantage of the systems and methods of the disclosed instrumentalities is that they may be readily used to pyrolyze hydrocarbon materials to produce hydrogen without significant emissions of carbon dioxide. Moreover, the systems and methods of the present invention are readily sized and configured to be placed at or nearby the source of natural gas (e.g., at the wellhead), thereby providing for the convenient production of hydrogen and carbon at the source, again without significant emissions of carbon dioxide.

Still other advantages are associated with recirculation loops, i.e., created by conduits 26 and 48. For example, the recirculation of portions of aerosol product 32 to intake 30 of reaction chamber 14 allows the provision of particulate seed material 56 to be terminated after system start-up, thereby minimizing the amount of particulate seed material 56 that must be used. The recirculation of the second gas constituent, i.e., comprising unreacted amounts of hydrocarbon reactant material 20 to intake 18 of plenum 16, allows the recirculated second gas constituent 46 to be mixed with basically the identical material within plenum 16, thereby reducing the amount of hydrocarbon reactant material 20 that must be separately provided. Thus, the disclosed instrumentalities pyrolyze substantially the entirety of the hydrocarbon reactant material 20 with minimal to no waste, e.g, such as would occur of unreacted hydrocarbon reactant material 20 were vented off after a single pass through reactor 12.

Still other advantages are associated with the use of porous felt material 82. More specifically, porous felt material 82 provides a convenient substrate for the collection of the dissociated particulate matter (e.g., carbon), reducing the accumulation of same on other portions of reactor 12. Moreover, the accumulated particulate matter tends not to agglomerate or crystallize on porous felt material 82, but rather tends to be continuously removed by the influx of hydrocarbon reactant material 20 from plenum 18. That is, the porous felt material is substantially continuously cleaned during operation, thereby further reducing maintenance. Still further, the substantially continuous removal of the dissociated particulate matter allows the same to be removed by filter system 34 with a minimum of contamination, thereby improving the overall quality of the carbon black material produced by system 10.

Having briefly described certain embodiments and variations of the systems and methods of pyrolyzing hydrocarbon materials according to the disclosed instrumentalities, as well as some of their more significant features or advantages, various embodiments and alternative configurations of the systems and methods of the disclosed instrumentalities will now be described in detail. However, before proceeding with the description it should be noted that while the disclosed instrumentalities are shown and described herein as they could be used in a fairly small-scale system, e.g., configured to be used at a natural gas wellhead, the disclosed instrumentalities are not limited to systems and methods of any particular size (i.e., production capacity) or scale, nor to any particular location.

Referring back now to FIG. 1, one embodiment of a system or apparatus 10 for pyrolyzing hydrocarbons is shown and described herein as it may be used to thermally dissociate or pyrolyze hydrocarbon reactant material 20. As used herein, the terms 'pyrolyze,' 'dissociate,' and their derivatives, refer to the thermal decomposition of hydrocarbons in the absence of oxygen to form solid carbon and hydrogen. Hydrocarbon reactant material 20 may be provided in a gaseous state and may comprise one or more hydrocarbons of the form $C_xH_y$, such as, for example, methane, $CH_4$, ethane, $C_2H_6$, and propane $C_3H_8$. Methane is the primary constituent of natural gas, with ethane and propane typically comprising minor constituents. Therefore, hydrocarbon reactant material 20 may comprise natural gas. Hydrocarbon reactant material 20 may also include small amounts of non-hydrocarbon materials, such as nitrogen, $N_2$, carbon dioxide, $CO_2$, and oxygen, $O_2$, which may also be found in natural gas. In the United States, pipeline quality natural gas typically comprises about 90-95 mol. % methane and may comprise about 4-6 mol. % nitrogen. Hydrocarbon reactant materials 20 suitable for use with the disclosed instrumentalities may be referred to herein in the alternative as methane or natural gas.

As is known, the thermal dissociation or pyrolyzation of such hydrocarbon reactant materials 20 results in the formation of carbon, C, primarily as carbon black, and gaseous hydrogen, $H_2$, in accordance with the following reaction:

$$C_xH_y + heat \rightarrow xC + (y/2)H_2$$

Figure 3:
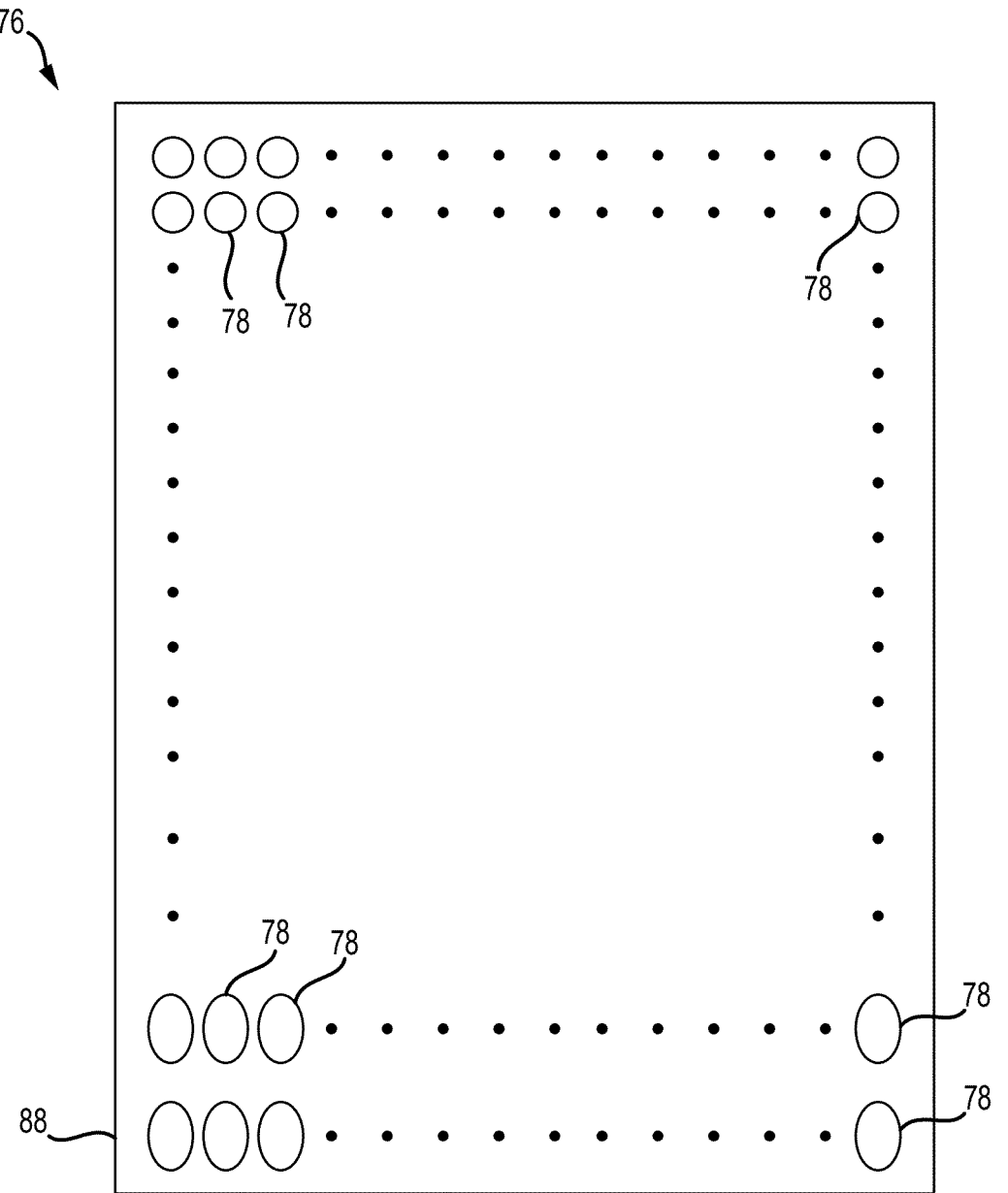
FIG. 3 is plan view of one embodiment of a reactor side wall according to the disclosed instrumentalities more clearly showing the arrangement of perforations defined thereby.

Still referring primarily to FIG. 1, system or apparatus 10 may comprise a reactor assembly 12 having a reaction chamber 14 and a plenum 16 in fluid communication with reaction chamber 14. In the particular embodiments shown and described herein, reactor assembly 12 may comprise a generally elongate, cylindrically-shaped housing 70 having a first end 72 and a second end 74 joined together by a side wall 76 so that reaction chamber 14 is defined therebetween. At least a portion of side wall 76 defines at least one, and generally a plurality, of apertures 78 therein, as best seen in FIGS. 1 and 3. Housing 70 may also include an intake 30, which may be located in or near first end 72. Housing 70 may also include an offtake 28, which may be located in or near second end 74.

In some embodiments, intake 30 of reaction chamber 14 may be provided with a swirl or turbulence inducer 79 to impart a degree of swirl or turbulence to aerosol reactant material 58 (e.g., mixture of particulate material and hydrocarbon reactant material 20) entering reaction chamber 14 via intake 30. Swirl inducer 79 promotes the mixing and distribution of particulate matter within aerosol reactant material 58 as it enters reaction chamber 14.

Reactor assembly 12 may also comprise a plenum 16 that is in fluid communication with reaction chamber 14. In the particular embodiments shown and described herein, plenum 16 may comprise a generally cylindrically-shaped member that surrounds housing 70 and is closed to side wall 76 so that an internal region or annular cavity 80 is defined therebetween. Annular cavity 80 of plenum 16 is in fluid communication with reaction chamber 14 via aperture(s) 78 defined by side wall 76. Plenum 16 may also comprise an intake 18 configured to receive hydrocarbon reactant material 20 from supply 21.

With reference now to FIGS. 1 and 3, plenum 16 and apertures 78 defined by side wall 76 of reactor assembly 12 function to distribute hydrocarbon reactant material 20 throughout reaction chamber 14. Accordingly, apertures 78 should be provided in sufficient numbers and sizes (e.g., hole areas) to ensure that the desired amount of hydrocarbon reactant material 20 enters reaction chamber 14 under the process conditions (e.g., pressure differential between interior region 80 and reaction chamber 14) involved. More specifically, and with reference now primarily to FIG. 3, which illustrates an 'unwrapped' cylindrical side wall 76, apertures 78 should be provided in sufficient numbers and sizes so as to not unduly impede the flow of the hydrocarbon reactant material 20 into reaction chamber 14. In some embodiments, apertures 78 may comprise substantially uniformly-spaced circular holes. However, in other embodiments, the sizing and spacing of apertures 78 may be non-uniform, as may be required or desired to achieve a desired distribution or influx of the hydrocarbon reactant material 20 within reaction chamber 14. For example, the sizing and spacing of apertures 78 may be varied depending on the number and location of intakes 18 that may be provided in plenum 16. In addition and/or alternatively, in the particular embodiments shown and described herein, apertures 78 provided near the lower end 88 of side wall 76 (i.e, adjacent second end 74 of housing 70) may comprise generally larger, arch- or oval-shaped holes. The larger arch- or oval-shaped holes allow any accumulated carbon particles to be more easily dislodged from the porous felt material 82 and refractory screen 84 (if provided), and thereafter depart reaction chamber 14 via offtake 28.

Housing 70 of reactor assembly 12, as well as plenum 16 may be fabricated from any of a wide range of materials, such as metals and metal alloys, that now known in the art or that may be developed in the future that are, or would be, suitable for the particular application and temperatures involved. Consequently, the disclosed instrumentalities should not be regarded as limited to any particular materials. However, by way of example, in one embodiment, housing 70 and plenum 16 may be fabricated from a stainless steel alloy.

As briefly mentioned above, reactor assembly 12 may also comprise a porous felt or cloth material 82 provided within reaction chamber 14 at a position generally abutting or adjacent aperture(s) 78 defined by side wall 76 of housing 70. See FIG. 1. Porous felt or cloth material 82 serves to further diffuse hydrocarbon reactant material 20 entering reaction chamber 14 from internal region 80 of plenum 16. Porous felt or cloth material 82 also serves as a substrate for collecting the particulate matter (e.g., carbon black) formed during the pyrolyzation process, thereby reducing the accumulation of same on the internal portions of reaction chamber 14, i.e., portions not covered by porous felt or cloth material 82.

Because 4 the high temperatures involved in the pyrolyzation reaction, porous felt or cloth material 82 should comprise a refractory material capable of withstanding the temperatures involved without significant degradation. By way of example, it is generally preferred, but not required, that porous felt material comprise carbon. Suitable carbon felt or cloth materials are readily commercially available from a wide range of vendors and could be readily provided by persons having ordinary skill in the art after having become familiar with the teachings provided herein. Consequently, the particular porous felt material 82 that may be utilized in conjunction with the disclosed instrumentalities will not be described in further detail herein. However, by way of example, in one embodiment, porous felt material 82 may comprise a carbon cloth material available from Mersen Corporate Services SAS of Courbevoie, France. The carbon cloth material may be provided with a thickness of about 6 mm, although other thickness may be used depending on the size, i.e., production capacity, of reactor assembly 12.

Depending on the particular porous felt material 82 that is used, it may be necessary or desirable to provide porous felt material 82 with a screen 84 to provide additional structural support for porous felt material 82. Screen 84 may be provided 'inboard' of felt material 82, e.g., generally adjacent reaction chamber 14 so that felt material 82 is captured or positioned between screen 84 and side wall 76. Alternatively, screen 84 could be located within felt material 82, as shown in FIG. 1. Screen 84 may comprise any of a wide range of materials, and in particular, refractory materials, suitable for withstanding the temperatures involved. By way of example, in one embodiment, screen material 84 is fabricated from a stainless steel alloy.

Reactor assembly 12 may also comprise a window 22. In the particular embodiments shown and described herein, window 22 is provided within or is supported by first end 72 of housing 70 so that light 25 produced by light source 24 will pass through window 22 and enter reaction chamber 14. Window 22 is substantially gas-tight and transparent to the particular wavelengths of light 25 that are to be used to heat aerosol reactant material 58 to a temperature sufficient to initiate the pyrolyzation process. In the particular embodiments shown and described herein wherein the light 25 used to initiate and maintain the pyrolyzation process is within the infrared wavelength range or band, window 22 should be substantially transparent to light in the infrared band. Suitable materials for transmitting light in the infrared band are well-known in the art and are readily commercially available. Therefore, the particular material that may be used for window 22 will not be described in further detail herein.

Apparatus 10 may also include a light source 24 operatively associated with window 22. Light source 24 produces electromagnetic radiation or light 25 and directs it into reaction chamber 14 via window 22. As described above, it is generally preferred, but not required, that the electromagnetic radiation 25 produced by light source 24 comprise light in the infrared band, e.g., light having wavelengths ranging from about 8 μm to about 15 μm. Light 25 having such wavelengths is particularly well suited for absorption by the particulate matter (e.g., carbon) comprising aerosol reactant material 58, thereby raising the temperature of aerosol reactant material 58 to temperatures sufficient to initiate pyrolyzation. Generally speaking, temperatures ranging from about 400° C. to about 1200° C. will be sufficient to pyrolyze hydrocarbon reactant material 20. By way of example, light source 24 may comprise a $CO_2$ laser that produces light 25 having a wavelength of about 10.6 μm.

The output power of light source 24 (e.g., $CO_2$ laser) may be selected to be commensurate with the desired capacity (i.e., production capability) of apparatus 10. In some embodiments, laser 24 may have a power output in the range of about 300 watts to about 1000 watts, although lasers having greater or lesser powers may also be used. In this regard it may be noted that about 1660 kiloJoules (kJ) of energy are required to dissociate 1 mol. of $CH_4$. Therefore, light source 24 (e.g., a laser) having an output of about 1000 watts will be capable of dissociating about 2.2 mol. of $CH_4$/hr.

Depending on the characteristics of the laser used as light source 24, reactor assembly 12 may also be provided with a beam spreader (not specifically shown) positioned adjacent window 22. Beam spreader may function to spread light beam 25 produced by laser 24 so that light beam 25 substantially fills the extent (e.g., diameter) of reaction chamber 14. Beam spreaders suitable for spreading light produced by light source 24 are readily commercially available and could be readily provided by persons having ordinary skill in the art after having become familiar with the teachings provided herein. If desired, a beam stop 86 may be provided on or nearby second end 74 of housing 70 to absorb any remaining laser light.

Still referring to FIG. 1, apparatus 10 may also include a first recirculation line or conduit 26. First recirculation line or conduit is operatively connected between offtake 28 of reaction chamber 14 and intake 30 of reaction chamber 14. As mentioned earlier, first recirculation line or conduit 26 recirculates to intake 30 of reaction chamber 14 a portion of aerosol product 32 produced within reaction chamber 14. First recirculation line or conduit 26 may be provided with one or more pumps 90 and valves 92 to control the pressure and flow rate of the recirculated aerosol product 32 in accordance with the teachings provided herein.

Filter system 34 is also operatively connected to offtake 28 of reaction chamber 14 and receives the balance (i.e., un-circulated amounts) of aerosol product 32 from reaction chamber 14. Filter system 34 removes particulate matter from aerosol product 32 as retentate 36. In the particular embodiments shown and described herein, retentate 36 may comprise carbon, primarily as carbon black, although other particulate matter may also be present and removed by filter system 34. Retentate 36 from filter system 34 may be collected, e.g., in container 96, for subsequent beneficial use. In some embodiments, retentate 36 may be removed from filter system 34 by reverse blowing with nitrogen (e.g., from nitrogen source 98).

The filtered aerosol product 32, i.e., substantially devoid of particulate matter, then leaves filter system 34 as filtrate 38. In the particular embodiments shown and described herein, filtrate 38 may comprise gaseous hydrogen as well as unreacted or undissociated amounts of hydrocarbon reactant material 20. Filtrate 38 may also comprise other gaseous constituents, e.g., nitrogen, that may have been present in hydrocarbon reactant material 20. Depending on the composition of hydrocarbon reactant material 20, filtrate 38 may also comprise incomplete dissociation products (e.g., $C_2H_2$, $C_2H_4$) or other gases.

The various lines and conduits associated with filter system 34 may also provided with a plurality of valves 92 to allow filter system 34 to be operatively connected and disconnected from offtake 28 of reaction chamber 14 and to allow filter system 34 to be purged from time-to-time with a non-reactant gas, such as nitrogen $N_2$, from a suitable supply 98. If desired, filter system 34 may also be provided with a bypass loop 11 to allow filter system 34 to be bypassed, e.g., for maintenance or other purposes.

The aerosol product 32 from offtake 28 of reaction chamber will typically be quite hot (e.g., having temperatures ranging from about 400° C. to about 1200° C.), so filter system 34 should be capable of handling materials, e.g., aerosol product 32, within that temperature range. By way of example, in some embodiments, filter system 34 may comprise one or more cyclone separators 94 of the type shown and described in U.S. Pat. No. 5,690,709, entitled "Separation Apparatus to Remove Particles from a Gas Stream" which is specifically incorporated herein by reference for all that it discloses. In other embodiments, filter system 34 may comprise one or more 'baghouses' having ceramic filter media (commonly referred to as 'ceramic candle filters'), which are also suitable for filtering particulate matter from high temperature gas streams. However, because filtration systems for removing particulate matter from hot gas streams are well-known in the art and readily commercially available, the particular filter system 34 that may be utilized in conjunction with the disclosed instrumentalities will not be described in further detail herein.

As mentioned earlier, filtrate 38 from filter system 34 may comprise filtered aerosol product 32 that is substantially devoid of particulate matter. In embodiments wherein hydrocarbon reactant material 20 comprises natural gas, filtrate 38 (i.e., filtered aerosol product 32), may comprise hydrogen, unreacted amounts of hydrocarbon reactant material 20, e.g., primarily methane, along with small amounts of ethane and propane. Filtrate 38 may also comprise partially-reacted amounts of hydrocarbon reactant material 20. Filtrate 30 may also include other constituents, e.g., primarily nitrogen, that may have been present in hydrocarbon reactant material 20. Filtrate 38 may then be directed first gas separator system 40.

First gas separator system 40 is operatively associated with filter system 34 and is configured to receive filtrate 38 and remove or strip first gas constituent 42 from filtrate 38. In the particular embodiments shown and described herein, first gas separator system 40 may comprise one or more membrane separator systems having one or more permeable membranes (not specifically shown). The permeable membrane(s) may be selected so that it preferentially passes (e.g., as a permeate) first gas constituent 42, e.g., $H_2$. The removed first gas constituent 42 may then be collected and/or stored for subsequent beneficial use. The retentate, i.e., comprising filtrate 38 but substantially devoid of first gas constituent 42, e.g., $H_2$, is then directed to second gas separator system 44.

The permeable membrane used to separate first gas constituent 42 from filtrate 38 may comprise any of a wide range of solubility-selective polymer membranes that are now known in the art or that may be developed in the future that are, or would be, suitable for the particular application and for removing the desired gas constituent. In this regard it should be noted that first gas separator system 40 may comprise a plurality of different types of permeable membranes (e.g., provided in series), for removing the desired constituents from filtrate 38, as would become apparent to persons having ordinary skill in the art after having become familiar with the teachings provided herein. Consequently, the disclosed instrumentalities should not be regarded as limited to gas separator systems having any particular type of permeable membrane, nor any particular number of membrane 'stages.'

Before proceeding with the description, it should be noted that, depending on the expected temperature of filtrate 38, i.e., after leaving filter system 34, and the maximum temperature permitted by first gas separator system 40 (e.g., the maximum permissible operational temperature of the permeable membrane material), it may be desired or required to first cool filtrate 38 before it enters first gas separator system 40. If so, filtrate 38 may first be directed through an optional heat exchanger 13 connected in series between filter system 34 and first gas separator system 40. Heat exchanger 13 cools filtrate 38 by removing heat, indicated by arrows H, therefrom and thereafter rejecting it to a suitable medium (e.g., ambient air or a liquid coolant).

Heat exchanger 13 may comprise any of a wide range of heat exchangers, as gas-to-gas or gas-to-liquid heat exchangers, now known in the art or that may be developed in the future that are (or would be) suitable for reducing the temperature of filtrate 38 to the desired temperature. However, since such heat exchangers are well-known in the art and could be readily provided by persons having ordinary skill in the art after having become familiar with the teachings provided herein, the particular heat exchanger that may be used in the particular embodiments shown and described herein will not be described in further detail.

In addition or alternatively to heat exchanger 13, apparatus 10 may also include an optional secondary filter system 15 to remove any residual particulate matter (e.g., carbon) remaining in filtrate 38. If secondary filter system 15 is to be used in addition to heat exchanger 13, then secondary filter system 15 may be located either upstream of or downstream from heat exchanger 13. In the particular embodiment illustrated in FIG. 1, secondary filter system 15 is located downstream from heat exchanger 13. If located downstream from heat exchanger 13, secondary filter system 15 need not necessarily be configured to handle high temperature filtrate 38 from filter system 34, but rather the cooled filtrate 38 exiting heat exchanger 13. In some embodiments, a pump 90 may be provided between heat exchanger 13 and/or secondary filter system 15 and first gas separator system 40 to make up for pumping losses in heat exchanger 13 and/or secondary filter system 15.

Secondary filter system 15 may comprise any of a wide range of filter systems and/or filter media suitable for filtering or removing any particulate matter that may remain in filtrate 38 before entering first gas separator system 40. Generally speaking, any remaining particulate matter will be considerably finer than retentate 36 removed by filter system 34, and so secondary filter system 15 may be configured to efficiently remove any such fine particulate matter from filtrate 38. Secondary filter system 15 may comprise any of a wide range of filter systems and/or media that are well-known in the art or that may be developed in the future that are (or would be) suitable for the particular application and particle sizes expected. Consequently, the disclosed instrumentalities should not be regarded as limited to any particular type of filter for secondary filter system 15. Particulate matter captured by secondary filter system 15 may be removed from time-to-time, e.g., by reverse blowing with nitrogen or another non-reactive gas, and thereafter collected for subsequent beneficial use.

In some embodiments, system 10 may be provided with a secondary heat exchanger system 27 to further cool filtrate 38. Secondary heat exchanger system 27 may be positioned downstream from heat exchanger 13, and either upstream of or downstream from secondary filter system 15 (if a secondary filter system 15 is provided). In the particular embodiment illustrated in FIG. 1, secondary heat exchanger system 27 is located upstream from secondary filter system 15.

Proceeding now with the description, second gas separator system 44 is configured to receive filtrate 38 stripped of first gas constituent 42 by first gas separator system 40. Second gas separator system 44 may comprise one or more membrane separator systems for separating a second gas constituent 46 from filtrate 38. Any of a wide range of permeable membranes may be used for this purpose. In the particular embodiments shown and described herein, the membrane material (not specifically shown) of second gas separator system 44 is selected so that it preferentially passes (e.g., as a permeate) second gas constituent 46, e.g., $N_2$. The removed second gas constituent 46 may then be vented to the atmosphere or collected and/or stored for subsequent beneficial use. The remaining material, i.e., the retentate, will typically comprise unreacted and partially-reacted amounts of the hydrocarbon reactant material 20, and may be directed to intake 18 of plenum 16 via second recirculation conduit 48. Second recirculation conduit 48 may be provided with a pump 90 to assist in the delivery of the retentate to intake 18 of plenum 16.

As was the case for first gas separator system 40, the permeable membrane used to separate second gas constituent 46 from filtrate 38 may comprise any of a wide range of solubility-selective polymer membranes that are now known in the art or that may be developed in the future that are, or would be, suitable for the particular application and for removing the desired gas constituent 46. In this regard it should be noted that second gas separator system 44 may comprise a plurality of different types of permeable membranes (e.g., provided in series), for removing the desired constituents from filtrate 38, as would become apparent to persons having ordinary skill in the art after having become familiar with the teachings provided herein. Consequently, the disclosed instrumentalities should not be regarded as limited to gas separator systems having any particular type of permeable membrane, nor any particular number of membrane stages.

In some embodiments, the conduits or material transfer lines associated with second gas separator system 44 may be provided with a plurality of valves 92 to allow second gas separator system 44 to be operatively connected to and disconnected from first gas separator system 40. If desired, second gas separator system 44 may also be provided with a bypass loop 17 to allow filter system 34 to be bypassed, e.g., for maintenance or other purposes.

It should be noted that system 10 may also be provided with any of a wide range of other systems, components, and devices, that may be required or desired for any particular application or operational configuration. For example, system 10 may be provided with one or more temperature sensors T, such as thermocouples or optical pyrometers, to sense the temperature of various components and material flows in various conduits or devices. Similarly, one or more pressure sensors (not specifically shown) could also be provided to sense or determine the pressures within various components. Some embodiments may be provided with one or more oxygen sensors and methane sensors (also not specifically shown) to sense or determine the relative amounts of oxygen and methane within system 10 to ensure that the gas levels are maintained either below or above respective lower and upper explosion limits. However, since such sensors are well-known in the art and could be readily provided by persons having ordinary skill in the art after having become familiar with the teachings provided herein, the particular types, numbers, and locations of various sensors that may be desired or required for any particular embodiment will not be described in further detail herein.

As was briefly described earlier, apparatus 10 may be operated in accordance with method 50 to produce gaseous hydrogen product 42 (e.g., $H_2$) by the pyrolyzation of hydrocarbon reactant material 20. Carbon (e.g., as carbon black) will also be produced by the pyrolyzation process. With reference now to FIGS. 1 and 2 simultaneously, a first step 52 of method 50 involves introducing hydrocarbon reactant material 20 into plenum 16. Hydrocarbon reactant material 20 may be provided from supply 21.

If system 10 is beginning from a 'cold' start, it will generally be necessary to first evacuate, or at least partially evacuate, and/or purge system or apparatus 10 in order to ensure that reactive materials (e.g., air and/or oxygen) are substantially entirely removed from the various systems and devices comprising system 10. In one embodiment, a vacuum pump (not specifically shown) may be connected to system 10 and operated to reduce the internal pressure of the various components of system 10 to an absolute pressure within the range of about 0.25 bar to about 0.75 bar, and more preferably to an absolute pressure of about 0.5 bar. Thereafter, system 10 may be purged with a non-reactive gas. Nitrogen gas, $N_2$, from nitrogen gas supply 98 (FIG. 1) may be used for this purpose. Alternatively, other non-reactive gases, such as argon, may be used as well.

Once sufficient oxygen has been removed, e.g., as may be sensed by one or more oxygen sensor(s) (not shown), the various pumps 90 and valves 92 comprising apparatus 10 may be operated to maintain apparatus 10 at a desired operational pressure or within a desired operational pressure range. Generally speaking, absolute pressures in the range of about 1 bar to about 1.5 bar will provide satisfactory results. The various recirculation conduits, i.e., first recirculation conduit 26 and second recirculation conduit 48, may be maintained at slightly higher pressures to ensure adequate flows of the recirculated material. By way of example, in one embodiment the 'main' system pressure, i.e., the pressure within reaction chamber 14, may be maintained at an absolute pressure of about 1.0 bar, whereas the absolute pressure in the recirculation conduits 26 and 48 may be maintained at about 1.3 bar. The resulting pressure differential will ensure that materials in the recirculation conduits 26 and 48 will flow into respective intakes 30 and 18 of reactor assembly 12. In this regard it should be noted that, during operation, there will be a reduction of gas volumes (and consequently pressure) as the various constituents, e.g., first and second gas constituents 42 and 46, are removed by gas separator systems 40 and 44. The removal of the various constituents will therefore serve to draw process reactants and by-products through system 10. The removal of the particulate matter (e.g., carbon) will produce a similar effect.

After the evacuation/purge process has been completed, hydrocarbon reactant material 20 (e.g., natural gas or methane) may be fed into intake 18 of plenum 16 at the desired pressure (e.g., 1.3 bar absolute). Because plenum 16 is in fluid communication with reaction chamber 14 and because reaction chamber 14 is maintained at a slightly lower pressure (e.g., about 1.0 bar absolute) interior region 80 of plenum 16, hydrocarbon reactant material 20 from supply 21 will flow into reaction chamber 14 via apertures 78 and porous felt material 82. See FIG. 1. A next step 54 of method 50 may involve the introduction of particulate material into intake 30 of reaction chamber 14. The particulate material mixes with hydrocarbon reactant material 20 within reaction chamber 14 to form or produce aerosol reactant material 58. As mentioned earlier, aerosol reactant material 58 should contain particulate matter (e.g., carbon) in quantities sufficient to absorb light 25 from light source 24 in sufficient amounts to initiate pyrolyzation of hydrocarbon reactant material 20.

The source of the particulate matter provided during step 54 may change depending on whether system 10 has reached substantially steady-state operation or is just being started. For example, upon system start-up, step 54 may involve the introduction of a particulate seed material 56 into intake 30 of reaction chamber 14.

In this regard it should be noted that during start-up, particulate seed material 56 may be fed (e.g., pneumatically) into reaction chamber 14 via a material feed stream 29 of hydrocarbon reactant material 20. A suitable venturi eductor (not specifically shown) may be used to draw a desirable quantity of particulate seed material 56 into material feed stream 29 and thence to inlet 30 of reaction chamber 14. The use of hydrocarbon reactant material 20 to convey particulate seed material 56 to reaction chamber 14 reduces the amount of non-reactive or inert material (e.g., nitrogen) flowing within system 10, thereby improving efficiency and productivity.

In some embodiments, the particulate seed material 56 may comprise carbon black having D50 particle sizes ranging from the sub-micron level up to about 100 μm. Thereafter, i.e., during operation, the particulate matter introduced during step 54 may comprise particulate material present in aerosol product 32 recirculated from offtake 28. The introduction of the particulate seed material 56 may then be terminated. In any event, the introduced particulate material mixes with the hydrocarbon reactant material 20 in reaction chamber to form aerosol reactant material 58.

Step 59 of method 50 involves exposing aerosol reactant material 58 contained within reaction chamber 14 to electromagnetic radiation, e.g., infrared light 25, produced by light source 24. The light 25 should be provided at an intensity sufficient to raise the temperature of the particulate matter (e.g., particulate seed material 56 or particulate matter from recirculated aerosol product 32) in aerosol reactant material 58 to a temperature sufficient to pyrolyze the hydrocarbon reactant material 20 and form aerosol product 32. Generally speaking, temperatures in the range of about 400° C. to about 1200° C. will be sufficient for this purpose. Continued pyrolyzation of the hydrocarbon reactant material 20 occurs as aerosol feedstock 58 travels through reaction chamber 14, before being withdrawn at step 60 from reaction chamber 14 via offtake 28 as aerosol product 32. As mentioned earlier, aerosol product 32 may comprise carbon, C (i.e., in particulate form, generally as carbon black), gaseous hydrogen, $H_2$, unreacted amounts of the hydrocarbon reactant material 20, and other constituents, e.g., nitrogen, $N_2$, or carbon dioxide, $CO_2$, that may also have been present in hydrocarbon reactant material 20.

In this regard it should be noted that not all of the hydrocarbon reactant material 20 contained in aerosol reactant 58 is pyrolyzed or dissociated within reaction chamber 14. This is due to the disbursed nature of aerosol reactant 58 combined with the relatively short residence time within reaction chamber 14. Longer residence times (e.g., due to lower flow rates), or denser aerosol reactants 58 (e.g., due to higher pressures) will generally result in higher levels of pyrolyzation or dissociation on a single pass through reaction chamber 14. Conversely, shorter residence times (e.g., due to higher flow rates) or lower reaction chamber pressures will generally result in lower levels of dissociation on a single pass. Generally speaking, in many embodiments, the systems and methods of the disclosed instrumentalities may dissociate or pyrolyze from about 50 mol. % to about 70 mol. %, of hydrocarbon reactant material 20 on any single pass through reaction chamber 14.

It should also be noted that the porous felt material 82 lining side wall 76 of reaction chamber 14 discourages the formed particulate carbon material from accumulating on the interior surfaces of reaction chamber 14. That is, rather than accumulating on the interior surfaces to the point where the carbon black may interfere with the efficient operation of the system, or crystallize into carbon graphite, neither of which is desirable, particulate carbon material formed during pyrolyzation accumulates on the porous felt material 82 in a dispersed state and is more or less continuously carried off by the flow of hydrocarbon reactant material 20 from interior region 80 of plenum 16 during operation.

In some embodiments, it may be desirable to introduce a catalyst material 23 into intake 30 of reaction chamber 14. Catalyst material 23 may be provided to improve reaction kinetics, reduce the temperature, and/or reduce the amount of energy (e.g., light 25 from light source 24) required to pyrolyze hydrocarbon reactant material 20. Catalyst material 23 may be fed (e.g., pneumatically) into reaction chamber 14 via material feed stream 29 of hydrocarbon reactant material 20. A suitable venturi eductor (not specifically shown) may be used to draw a desirable quantity of catalyst material 23 into material feed stream 29 and thence to inlet 30 of reaction chamber 14. The use of hydrocarbon reactant material 20 to convey catalyst material 23 to reaction chamber 14 reduces the amount of non-reactive or inert material (e.g., nitrogen) flowing within system 10, thereby improving efficiency and productivity.

Catalyst material 23 may comprise any of a wide range of catalyst materials now known in the art or that may be developed in the future that are or would be suitable for catalyzing the pyrolyzation of hydrocarbon reactant material. Consequently, the disclosed instrumentalities should not be regarded as limited to any particular catalyst material. However, by way of example, in some embodiments, catalyst material 23 may comprise one or more from the group consisting of carbon black, activated carbon, and oxides of certain metals, such as, for example, $Fe_3O_4$, $Fe_2O_3$, FeO, CoFeNi oxide, and may be provided in quantities commensurate with the amount (or rate of introduction) of hydrocarbon reactant material 20. Catalyst material 23 may be provided in powder form and may have a D50 particle size ranging from about 50 μm to about 100 μm. Any catalyst material 23 used may be removed by filter system 34 and separated from collected carbon for subsequent re-use.

Step 61 involves recirculating a portion of the withdrawn aerosol product 32 to intake 30 of reaction chamber 14. Thereafter, the recirculated portion of aerosol product 32 will mix with additional quantities of the hydrocarbon reactant material 20 provided via plenum 16. The particulate matter in aerosol product 32 may then form the particulate matter introduced in step 54, thereby allowing the introduction of particulate seed material 56 to be terminated in the manner already described. The recirculated unreacted hydrocarbon reactant material 20 will be added to hydrocarbon reactant material 20 flowing into reaction chamber 14 from plenum 16.

It should be noted that the amount of aerosol product 32 to be recirculated to intake 30 of reaction chamber 14 may depend on a range of factors, not least of which is the amount of particulate material contained in aerosol product 32 versus the amount of particulate material desired in aerosol reactant material 58 to provide good pyrolyzation. Consequently, the disclosed instrumentalities should not be regarded as limited to any particular recirculated amount. However, by way of example, the amount of recirculated aerosol product 32 may be in a range of about 5 vol % to about 15 vol % (about 10 vol % preferred) of aerosol product 32 withdrawn from offtake 28.

Referring back now to FIG. 2, in step 62 of method 50, the un-recirculated portion or balance of aerosol product 32 is next filtered, e.g., by filter system 34, to remove particulate matter (e.g., substantially as carbon black) as retentate 36. Retentate 36 may be removed from filter system 34 for subsequent beneficial use. Filtrate 38 from filtering step 62 may comprise substantially gaseous constituents, although some particulate matter may remain depending on the performance characteristics of filter system 34. Step 64 of method 50 separates first gas constituent 42 (e.g., hydrogen) from filtrate 38. The first gas constituent 42 may thereafter be collected for subsequent beneficial use.

Second gas separation step 66 removes second gas constituent 46 from filtrate 38. Second gas constituent may comprise undissociated or partially dissociated amounts of the hydrocarbon reactant material 20. Second gas constituent 46 is then recirculated at step 68 to intake 18 of plenum 20 for subsequent pyrolyzation. Any remaining constituents from filtrate 28, e.g., primarily gaseous nitrogen, $N_2$ may be vented to the atmosphere or collected for subsequent beneficial use.

Unless defined otherwise, all technical and scientific terms used herein have the same meaning as commonly understood by persons having ordinary skill in the art to which the invention pertains. Although any systems, methods, and materials similar or equivalent to those described herein can be used in practice for testing of the present invention, the preferred systems, methods, and materials are described herein.

In understanding the scope of the present invention, the articles "a" and "an" are used herein to refer to one or to more than one (i.e., to at least one) of the grammatical object of the article. By way of example, "an element" means one element or more than one element. The term "comprising" and its derivatives, as used herein, are intended to be open ended terms that specify the presence of the stated features, elements, components, groups, and/or steps, but do not exclude the presence of other unstated features, elements, components, groups, and/or steps. The foregoing also applies to words having similar meanings such as the terms, "including," "having" and their derivatives. Any terms of degree such as "substantially," "about" and "approximate" as used herein mean a reasonable amount of deviation of the modified term such that the end result is not significantly changed. When referring to a measurable value, such as an amount, a temporal duration, and the like, these terms are meant to encompass variations of at least ±20% or ±10%, more preferably ±5%, even more preferably ±1%, and still more preferably ±0.1% from the specified value, as such variations are appropriate and as would be understood by persons having ordinary skill in the art to which the invention pertains.

Throughout this disclosure, various aspects of the invention may be presented in a range format. It should be understood that the description in a range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.6, 3, 4, 5, 5.7, and 6. This applies regardless of the breadth of the range.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adapted to another embodiment. It should be noted that while the present invention is shown and described herein as it could be used in conjunction with a configuration of various components, it could be utilized with other configurations, either now known in the art or that may be developed in the future, so long as the objects and features of the invention are achieved, as would become apparent to persons having ordinary skill in the art after having become familiar with the teachings provided herein. Consequently, the present invention should not be regarded as limited to that shown and described herein. It is not necessary for all advantages to be present in a particular embodiment at the same time. Thus, the foregoing descriptions of the embodiments according to the present invention are provided for illustration only, and not for the purpose of limiting the invention as defined by the appended claims and their equivalents.

Having herein set forth preferred embodiments of the present invention, it is anticipated that suitable modifications can be made thereto which will nonetheless remain within the scope of the invention. The invention shall therefore only be construed in accordance with the following claims:

The invention claimed is:

1. Apparatus for pyrolyzing a gaseous hydrocarbon reactant material to produce hydrogen gas, comprising:
   a reactor, said reactor including:
      a reaction chamber having an intake and an offtake, the reaction chamber also defining a plurality of apertures therein;
      a porous felt material positioned within the reaction chamber at a position adjacent the plurality of apertures;
      a plenum having an intake configured to receive the gaseous hydrocarbon material, the plenum being in fluid communication with the plurality of apertures so that gaseous hydrocarbon reactant material within the plenum flows into the reaction chamber via the plurality of apertures and the porous felt material;
      a window, the window allowing electromagnetic radiation to enter the reaction chamber;
   a light source operatively associated with the window of said reactor, said light source directing electromagnetic radiation into the reaction chamber through said window;
   a first recirculation conduit operatively connected between the offtake of the reaction chamber and the intake of the reaction chamber, said first recirculation conduit recirculating to the intake of the reaction chamber a portion of an aerosol product from the offtake of the reaction chamber;
   a filter operatively associated with the offtake of the reaction chamber, said filter receiving un-recirculated amounts of the aerosol product from the reaction chamber, said filter producing a filtrate and a retentate, the retentate comprising particulate matter removed from the aerosol product;
   a first gas separator operatively associated with said filter, said first gas separator separating a first gas constituent from the filtrate, the first gas constituent comprising hydrogen;
   a second gas separator operatively associated with said first gas separator, said second gas separator separating a second gas constituent from the filtrate, the second gas constituent comprising unreacted amounts of the gaseous hydrocarbon reactant material; and
   a second recirculation conduit operatively connected between said second gas separator and the intake of the plenum of said reactor, said second recirculation conduit recirculating to the intake of the plenum the second gas constituent removed by said second gas separator.

2. The apparatus of claim 1, further comprising a heat exchanger operatively connected between said filter and said first gas separator, said heat exchanger cooling the filtrate from said filter before the filtrate enters said first gas separator.

3. The apparatus of claim 2, further comprising a second filter operatively associated with said heat exchanger, said second filter removing additional amounts of particulate matter retained in the filtrate before the filtrate is directed to said first gas separator.

4. The apparatus of claim 3, further comprising a second heat exchanger operatively connected between said heat exchanger and said second filter.

5. The apparatus of claim 1, wherein said first gas separator comprises a gas permeable membrane and wherein the first gas constituent comprises a permeate of the gas permeable membrane of said first gas separator.

6. The apparatus of claim 1, wherein said first gas separator comprises a gas permeable membrane and wherein the first gas constituent comprises a retentate of the gas permeable membrane of said first gas separator.

7. The apparatus of claim 1, wherein said second gas separator comprises a gas permeable membrane and wherein the second gas constituent comprises a permeate of the gas permeable membrane of said second gas separator.

8. The apparatus of claim 1, wherein said second gas separator comprises a gas permeable membrane and wherein the second gas constituent comprises a retentate of the gas permeable membrane of said second gas separator.

9. The apparatus of claim 1, wherein the intake of the reaction chamber is configured to receive a particulate seed material and introduce defined quantities of the particulate seed material into the reaction chamber of said reactor.

10. The apparatus of claim 9, wherein the intake of the reaction chamber is configured to receive a catalyst material and introduce defined quantities of the catalyst material into the reaction chamber of said reactor.

11. The apparatus of claim 1, further comprising a turbulence inducer operatively associated with the intake of the reaction chamber.

12. The apparatus of claim 1, further comprising a screen positioned between the porous felt material and an interior region of the reaction chamber.

13. The apparatus of claim 1, further comprising a screen positioned within the porous felt material.

14. The apparatus of claim 1, wherein the porous felt material comprises a refractory material.

15. The apparatus of claim 14, wherein the refractory porous felt material comprises carbon.

16. The apparatus of claim 1, wherein the plurality of apertures defined by the reaction chamber are sized and spaced to achieve a desired distribution of the hydrocarbon material along a length of the reaction chamber.

17. The apparatus of claim 16, wherein some of the plurality of apertures comprise circularly-shaped apertures and wherein others of the plurality of apertures comprise oval-shaped apertures.

18. The apparatus of claim 1, wherein said light source produces electromagnetic radiation having wavelengths in a range of about 8 μm to about 15 μm.

19. The apparatus of claim 18, wherein said light source comprises a laser.

20. The apparatus of claim 19, wherein said laser comprises a $CO_2$ laser.

21. The apparatus of claim 1, further comprising a supply of nitrogen gas operatively connected to said reactor.

22. A reactor, comprising:

a housing comprising a first end, a second end, and a side wall connecting the first and second ends so that a reaction chamber is defined therebetween, at least a portion of the side wall of said housing defining a plurality of apertures therein, said housing also defining an intake and an offtake;

a porous felt material provided within said housing at a position adjacent the plurality of apertures;

a plenum surrounding at least the portion of the side wall defining the plurality of apertures, said plenum having an intake, said plenum being substantially closed to the side wall of said housing so that an internal region defined by said plenum and the side wall of said housing is in fluid communication with the reaction chamber via the plurality of apertures and the porous felt material; and a window mounted within the first end of said reaction chamber, said window being substantially gas-tight and substantially transparent to electromagnetic radiation in at least an infrared wavelength range so that infrared electromagnetic radiation passing through said window enters the reaction chamber defined by said housing of said reactor.

23. The reactor of claim 22, wherein the porous felt material comprises carbon.

24. The reactor of claim 22, further comprising a screen positioned adjacent the porous felt material and the reaction chamber defined by said housing.

25. The reactor of claim 22 further comprising a screen positioned within the porous felt material.

26. The reactor of claim 22, wherein said housing comprises an elongate cylindrically-shaped member and wherein the plurality of apertures defined by the side wall of said housing comprises a plurality of holes that extend substantially around the entirety of a circumference of the side wall and extend along a length of the side wall for a distance that is less than a distance separating the first and second ends of said housing, and wherein said plenum comprises a generally cylindrically-shaped member that surrounds the side wall of said housing and encloses the plurality of holes in the side wall of said housing so that the internal region defined by said plenum is in fluid communication with the reaction chamber via the plurality of holes in the side wall of said housing and the porous felt material.

* * * * *